Feb. 27, 1962  E. A. THOMPSON  3,023,055
PRESSURE FED ROCKER SHOE BEARING
Filed March 14, 1960
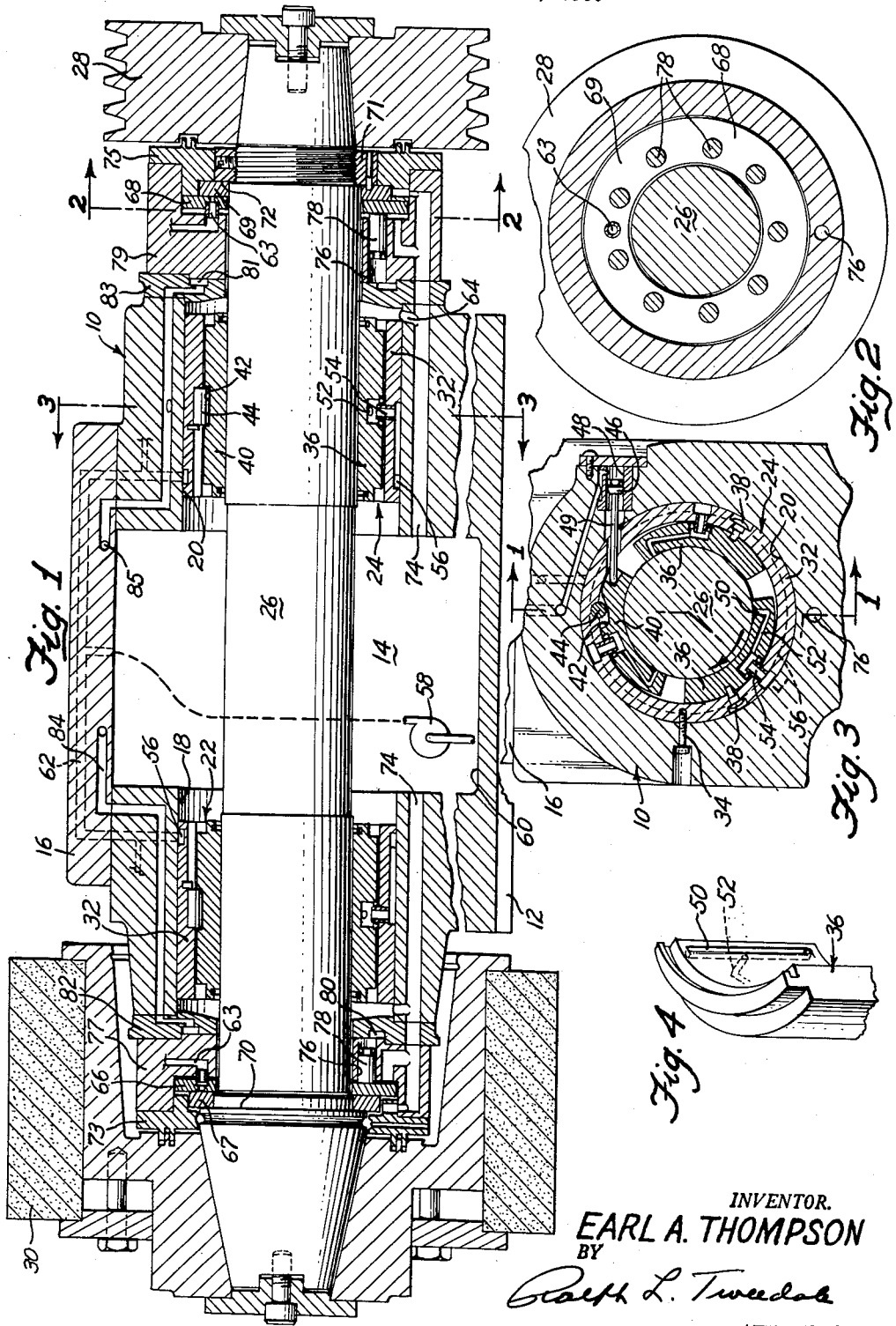
INVENTOR.
EARL A. THOMPSON
BY
Ralph L. Tweedale
ATTORNEY

3,023,055
PRESSURE FED ROCKER SHOE BEARING
Earl A. Thompson, 1300 Hilton Road,
Ferndale 20, Mich.
Filed Mar. 14, 1960, Ser. No. 14,708
12 Claims. (Cl. 308—73)

This invention relates to a pressure fed rocker shoe bearing and to a grinding machine spindle incorporating the same.

In one aspect the invention is an improvement upon the bearing disclosed in Thompson Patent Re. 25,028, the original of which was filed December 6, 1955, for a bearing.

In the construction shown in that patent, it is necessary that the bearing compartment be flooded with oil for reliable operation under heavy loads and, when thus flooded, the viscous drag on the shaft becomes excessive for high speed applications.

It is accordingly the object of the present invention to provide a bearing of the rocker shoe type having the advantage of the patent in construction and yet which does not require a flooded bearing compartment for successful operation and can thus be operated at both high load and high speed.

Another object of the present invention is to provide a spindle bearing construction particularly suited for grinding machines and the like which incorporates a rocker shoe bearing for radial loads and which is provided with thrust bearings so arranged that an endwise oscillatory motion may be readily imparted to the spindle.

Further objects and advantages of the present invention will be apparent from the following detailed description, with reference to the accompanying drawings in which like reference characters refer to the same parts throughout the several views, and in which:

FIGURE 1 is a longitudinal sectional view on line 1—1 of FIGURE 3 of a grinding machine wheel spindle incorporating a preferred form of the present invention;

FIGURE 2 is a sectional view on line 2—2 of FIGURE 1;

FIGURE 3 is a sectional view on line 3—3 of FIGURE 1; and

FIGURE 4 is a fragmentary perspective view of a rocker shoe showing the oil supplying groove.

The spindle and bearing assembly illustrated in the drawings comprises a main housing 10 having a suitable mounting dovetail 12 at its base. The housing 10 is provided with a central cavity 14 closed by a cover 16, and is provided with two co-axial laterally extending cartridge receiving bores 18 and 20. Mounted in the bores 18 and 20 are identical bearing cartridges 22 and 24 on which is supported, in a radial direction only, the rotatable trunnion such as a grinding wheel spindle 26. This may carry a suitable driving pulley 28 at one end and a grinding wheel assembly 30 at the other.

Each of the bearing cartridges 22 and 24 comprises an outer annular sleeve or race member 32 which is closely fitted in its bore and retained by a set screw 34. Rockably mounted within the inner bore of each sleeve 32 are two or more bearing shoes 36 having outer surfaces curved to a slightly smaller radius than the inner radius of the sleeve 32. Suitable loose fitting anchor pins 38 engage loosely in recesses in the shoes 36 to prevent their displacement but without interfering with rocking motion of a small amount.

A third rocker shoe 40 is adjustably mounted in each sleeve 32 by means of a spiral cam surface 42 and a stationary cam follower 44 so that the rocker 40 may be shifted counter-clockwise circumferentially to take up radial clearance between the three bearing shoes and the spindle 26. Suitable tangential biasing means for the shoe 40 is provided in the form of a hydraulic plunger 46 slidable in a cylinder 48 and having a stem 49 engageable with the shoe 40. The cylinder 48 may be supplied with oil under constant pressure from any suitable source to urge the shoe 40 against the spindle 26.

Each of the rocker shoes 36 and the shoe 40 of each cartridge assembly 22, 24 is provided with means for supplying oil under positive pressure from an outside source to the bearing surface very close to the leading edge of the shoe. This may take the form of a groove 50, as seen more clearly in FIGURE 4, having a somewhat rounded trailing edge. The groove 50 may be supplied with oil from drilled passageways 52 which may be fed from a flexible tubular passage 54 connected to an annular chamber 56. A pump 58, schematically shown, delivers oil from a sump 60 through a passage 62 to the annular chambers 56. A suitable return passage 64 drains each bore 18 and 20 into the sump 60.

The spindle 26 is reciprocable endwise within the bearings 22 and 24 and its endwise position is determined by controlling the position of a pair of oppositely acting pistons or thrust bearings 66 and 68. These ride on oil from lines 63 against oppositely facing thrust bearing rings 67 and 69 which abut shoulders 70 and 72 formed on the spindle 26 and by a nut 71 thereon, respectively. These thrust bearings are enclosed within suitable end caps 73 and 75 which provide suitable labyrinth seals as shown for collecting escaping lubricant and are secured to cylinder members 77 and 79 which are a continuation of the end of the housing 10. Suitable drain passages 74 may be provided in the end caps, the cylinder members, and the body 10 for returning leaked oil to the sump 60.

Each of the cylinder members 77 and 79 is provided with a plurality of axial bores or cylinders 76 distributed around the circle adjacent the annular pistons or thrust bearings 66 and 68. Slideably mounted in each bore 76 is an actuating piston 78, the outer end of which abuts against the respective thrust bearing 66 or 68. All of the bores 76 communicate with common oil distributing grooves 80, 81 formed in the outer face of spacer rings 82 and 83, respectively. The groove 80 may be connected by suitable passages 84 with a hydraulic pulsating mechanism of any suitable type for providing alternating pulses of oil into and out of groove 80. The groove 81 may be connected by a passage 85 to a suitable constant pressure source of oil such as an accumulator for maintaining a constant bias on pistons 78.

The operation of the improved trunnion and pressure fed bearing is analogous to but somewhat different from a conventional rocker shoe type of journal bearing. The latter depends upon submergence of the journal in a body of oil so that the shaft rotation can, by viscous friction, form a wedge of lubricant between the journal and the shoe. Due to the rocking action of the shoe the latter takes up a position such that the pressure distribution in the oil film is substantially balanced along the arcuate bearing surface of the shoe. If the lubricant film pressure tends to increase on the trailing side of the shoe, the shoe will rock slightly to close the clearance at the leading edge of the shoe and thus restore the pressure balance. Similarly an opposite action takes place when there is too little pressure at the trailing edge of the shoe. In the present invention the same action takes place except that it is modified by the provision of a continual flow of oil to the leading edge of each shoe from the pump 58 through the lubricant passages to the groove 50. The pressure balance across the whole face of the shoe will be determined in part by the speed of the shaft after the manner of conventional rocker shoe bearings and in part by the oil pressure and load.

The spindle may be reciprocated by operation of the pulsating oil supply fed to the groove 80 where it re-acts upon the pistons 78 and, on the leftward stroke, overcomes the constant pressure bias exerted from the groove 81 on the pistons 78 at the right end of the spindle. As the pulsator withdraws oil from the groove 80 the constant pressure in groove 81 predominates and the spindle returns to the right. It will be understood that the spindle may be retained in a stationary position endwise by venting the passage 80 thus permitting the pistons 78 to bottom and the piston race 66 to ride against the bearing flat surface of the ring 67.

It will thus be seen that the present invention provides an improved grinding machine spindle having a pressure fed rocker shoe bearing which is capable of operating both at high loads and high speeds and in which the viscous friction drag on the spindle is present only at the actual bearing surfaces where loads must be supported.

While the above described embodiment constitutes a preferred mode of carrying out this invention, many other forms might be adopted within the scope of the actual invention, which is variously claimed as:

1. A journal bearing comprising a shaft, a plurality of bearing segments having inner surfaces closely surrounding the shaft, a housing enclosing the segments, means in the housing supporting the segments for individual small rocking movements to vary the relative clearances at the leading and trailing ends of the segments, a source of lubricating fluid under pressure, passages for conducting fluid from the source to the bearing surfaces of the segments at a zone generally coincident with only the leading edge thereof to form between each surface and the shaft a hydrodynamic wedge of lubricating fluid, and means for draining the housing of all lubricating fluid which may escape from the segments to reduce viscous drag on the shaft.

2. A journal bearing comprising a shaft, a plurality of bearing segments having inner surfaces closely surrounding the shaft, a housing enclosing the segments, means in the housing supporting the segments for individual small rocking movements to vary the relative clearances at the leading and trailing ends of the segments, a source of lubricating fluid under pressure, passages for conducting fluid from the source to the bearing surfaces of the segments at a zone generally coincident with only the leading edge thereof to form between each surface and the shaft a hydrodynamic wedge of lubricating fluid, said passages each including a delivery opening on the bearing surfaces and a flexible connection between the housing and the segment, and means for draining the housing of all lubricating fluid which may escape from the segments to reduce viscous drag on the shaft.

3. A journal bearing comprising a shaft, a plurality of bearing segments having inner surfaces closely surrounding the shaft, a housing enclosing the segments and including drain means to keep the lubricant level below the shaft, means in the housing supporting the segments for individual small rocking movements to vary the relative clearances at the leading and trailing ends of the segments, a pressure lubricating pump connected to supply pressure fluid individually to the inner surfaces of the segments, and fluid operated means connected to impart to-and-fro axial motion to the shaft relative to the housing.

4. A bearing assembly comprising a housing shaped to provide a longitudinal, trunnion-receiving bore, a pair of self-adjusting rocker-shoe bearings mounted in axially spaced relation in said bore, a trunnion journalled in the bearings and having a pair of oppositely facing shoulders, thrust bearings mounted against the shoulders, means associated with the housing for yieldably biasing one thrust bearing toward the corresponding shoulder on the trunnion and oscillatory means having abutting contact with the other thrust bearing in the opposite direction.

5. A bearing assembly comprising a housing including a longitudinal shaft receiving bore, a pair of rocker shoe bearings mounted in axially spaced relation in the bore, a shaft journalled in the bearings and having a pair of opposed, annular shoulder means, a pair of annular thrust bearings surrounding the shaft and positioned one against each of the opposed shoulder means, a pair of cylinders in the housing each including a piston shiftable axially against one of the thrust bearings, and fluid means connected to selectively bias the pistons against the thrust bearings to control the axial relationship of the shaft with the housing.

6. A bearing assembly comprising a housing member including a pair of axially spaced bearing arrangements, a shaft member journalled in the bearing arrangements for limited axial movement as well as rotary movement, a pair of opposed, annular shoulder means on one of the members, a pair of annular thrust bearings surrounding the shaft member and positioned one against each of the opposed shoulder means, a pair of cylinders formed in the other member each including an annular piston surrounding the shaft member and shiftable axially against one of the thrust bearings, and fluid means connected to selectively bias the pistons against the thrust bearings to control the axial relationship of the shaft member with the housing member.

7. A bearing assembly comprising a shaft having a pair of oppositely facing shoulders, a shaft housing having a self-adjusting rocker shoe bearing rotatably supporting the shaft, the bearing including a plurality of segments having inner surfaces closely surrounding the shaft, means in the housing supporting the segments for individual small rocking movements to vary the relative clearances at the leading and trailing ends of the segments, a pair of co-acting cam surfaces on the housing and one of the segments operable in response to a yieldable biasing force acting laterally on the one segment in opposition to shaft rotation to adjust the radial spacing of the segment inner surfaces, a pressure lubricating pump connected to supply pressure fluid to the inner surfaces of the segments, means for draining the housing of all such fluid which may escape from the segments, and means associated with the housing for yieldably biasing one shaft shoulder in one direction and oscillatory means having abutting contact with the other shoulder bearing in the opposite direction.

8. A journal bearing comprising a shaft, a plurality of bearing segments having inner surfaces closely surrounding the shaft, a housing enclosing the segments, means in the housing supporting the segments for individual small rocking movements to vary the relative clearances at the leading and trailing ends of the segments, a pair of co-acting cam surfaces on the housing and one of the segments operable in response to a yieldable biasing force acting laterally on the one segment in opposition to shaft rotation to adjust the radial spacing of the segment inner surfaces, and fluid operated means connected to impart to-and-fro axial motion to the shaft relative to the housing.

9. A journal bearing comprising a shaft, a plurality of bearing segments having inner surfaces closely surrounding the shaft, a housing enclosing the segments, means in the housing supporting the segments for individual small rocking movements to vary the relative clearances at the leading and trailing ends of the segments, a pair of co-acting cam surfaces on the housing and one of the segments operable in response to a yieldable biasing force acting laterally on the one segment in opposition to shaft rotation to adjust the radial spacing of the segment inner surfaces, a source of lubricating fluid under pressure, passages for conducting fluid from the source to the leading edge of the bearing surfaces of the segments, and means for draining the housing of lubricating fluid which may escape from the segments.

10. A journal bearing comprising an elongated shaft, a plurality of bearing segments having inner surfaces closely surrounding the shaft, a shaft housing enclosing the segments, means supporting the segments in the housing closer to one end than the other for individual small rocking movements in a single plane transverse to the shaft axis to vary the relative clearances at the leading and trailing ends of the segments, a pair of co-acting cam surfaces on the housing and one of the segments operable in response to a generally tangential biasing force acting on the one segment in opposition to shaft rotation to adjust the radial spacing of the segment inner surfaces, a source of lubricating fluid under pressure, passages for conducting fluid from the source to an axially extending zone generally coincident with only the leading edge of each bearing surface to help rock each leading edge away from the shaft for formation of a hydrodynamic wedge of lubricating fluid, and means for draining the housing of all lubricating fluid which may escape from the segments to reduce viscous drag on the shaft.

11. A preloaded dynamically lubricated shaft journal bearing comprising a housing forming a support spaced radially from the shaft, a first and a second segmental bearing shoe each mounted in the housing for slight rocking movement, pressure means connected to supply the leading edge of each shoe with lubricant to generate dynamically a load supporting wedge of lubricant between the shaft and the shoe, means mounting the second shoe for bodily movement circumferentially and radially with respect to the housing and shaft and co-related so that circumferential motion in the direction of shaft rotation produces radially outward motion, yieldable biasing means urging the second shoe counter to the direction of shaft rotation with a predetermined force whereby to preload the second bearing shoe against the dynamic fluid pressure in the lubricant wedge by an amount determined by the frictional drag of the lubricant against the second shoe in opposition to the biasing force so that the shaft is supported by lubricant wedges sufficiently thin that large changes in external load on the shaft do not produce significant shaft displacement, and drain means in the housing connected to keep the level of excess lubricant which may escape from the individually pressure lubricated shoes below the level of the shaft to reduce viscous drag on the shaft.

12. A preloaded anti-friction bearing arrangement for supporting a high speed rotating shaft with a high degree of positional stability through different speed ranges compriisng in combination a stationary housing enclosing a portion of the shaft, a plurality of rocker shoes mounted in the housing for limited oscillatory movement to define with the rotating shaft a plurality of generally mutually variable wedge-shaped lubricant zones diminishing toward the trailing edges of the shoes, pressure means for supplying lubricant individually to the leading edges of the shoes to flow between the shoes and the rotating shaft to create a plurality of hydrodynamic films of lubricant in the wedge-shaped zones for bearing the shaft, yieldable balancing means connected between the housing and one of the shoes, shoe clearance regulating means dynamically responsive to the shaft speed for widening the wedge-shaped zones and also oppositely responsive to the yieldable balancing means for narrowing the wedge-shaped zones whereby the size of the lubricant films is automatically varied to complement their dynamic shaft bearing pressure thus supporting the shaft with a high degree of positional stability through different speed ranges, and drain means in the housing connected to keep the level of excess lubricant which may escape from the individually pressure lubricated shoes below the level of the shaft to reduce viscous drag on the shaft.

References Cited in the file of this patent
UNITED STATES PATENTS

| | | |
|---|---|---|
| 2,348,928 | Sampatocos | May 16, 1944 |
| 2,389,687 | Rickenmann | Nov. 27, 1945 |